United States Patent [19]

Brown et al.

[11] Patent Number: 5,370,579
[45] Date of Patent: Dec. 6, 1994

[54] LEGUME POD THRESHER

[75] Inventors: Kenneth Brown, New Costessey, England; Franklin P. Orlando, Morgan Hill, Calif.; Frederick A. Zemke, Hoopeston, Ill.

[73] Assignee: FMC Corporation, Chicago, Ill.

[21] Appl. No.: 233,551

[22] Filed: Apr. 26, 1994

Related U.S. Application Data

[63] Continuation of Ser. No. 920,966, Jul. 28, 1992, abandoned.

[51] Int. Cl.5 .............................................. A01F 12/18
[52] U.S. Cl. .................................................... 460/142
[58] Field of Search ............... 460/131, 132, 133, 134, 460/141, 142

[56] References Cited

U.S. PATENT DOCUMENTS

| 2,543,537 | 2/1951 | Smith | 460/141 X |
| 2,768,628 | 10/1956 | Hermanson | 460/142 |
| 3,709,231 | 1/1973 | Looker et al. | 460/142 |
| 3,771,531 | 11/1973 | Scribner | 460/142 |
| 3,826,267 | 7/1974 | Scribner | 460/142 |
| 4,232,506 | 11/1980 | Studer | 56/327.1 |
| 4,335,570 | 6/1982 | Fitzmaurice | 56/327.1 |
| 4,927,440 | 5/1990 | Butler et al. | 56/12.8 |

*Primary Examiner*—Terry Lee Melius
*Attorney, Agent, or Firm*—Henry C. Query, Jr.; Richard B. Megley

[57] ABSTRACT

In the harvesting of legumes, apparatus having a plurality of rods mounted on a rotating axle provides a vibratory contact force to the seed containing pods to provide acceleration and impact forces to separate the seeds from the shells or pods containing the seeds.

23 Claims, 4 Drawing Sheets

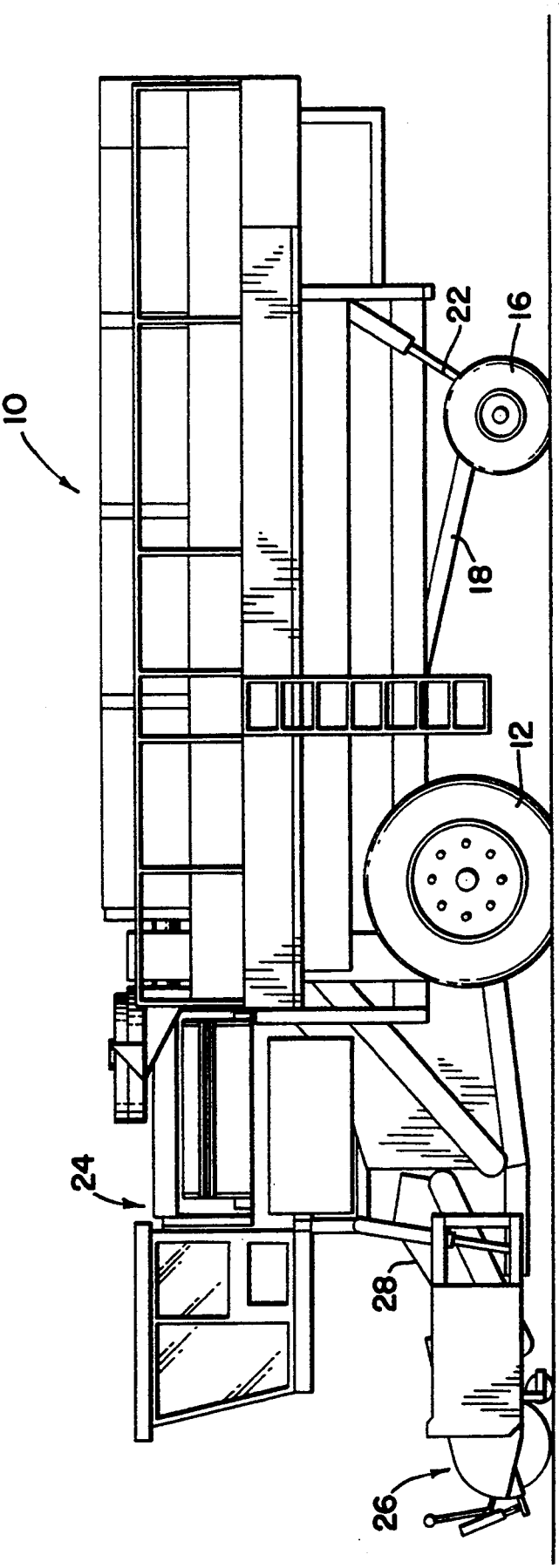

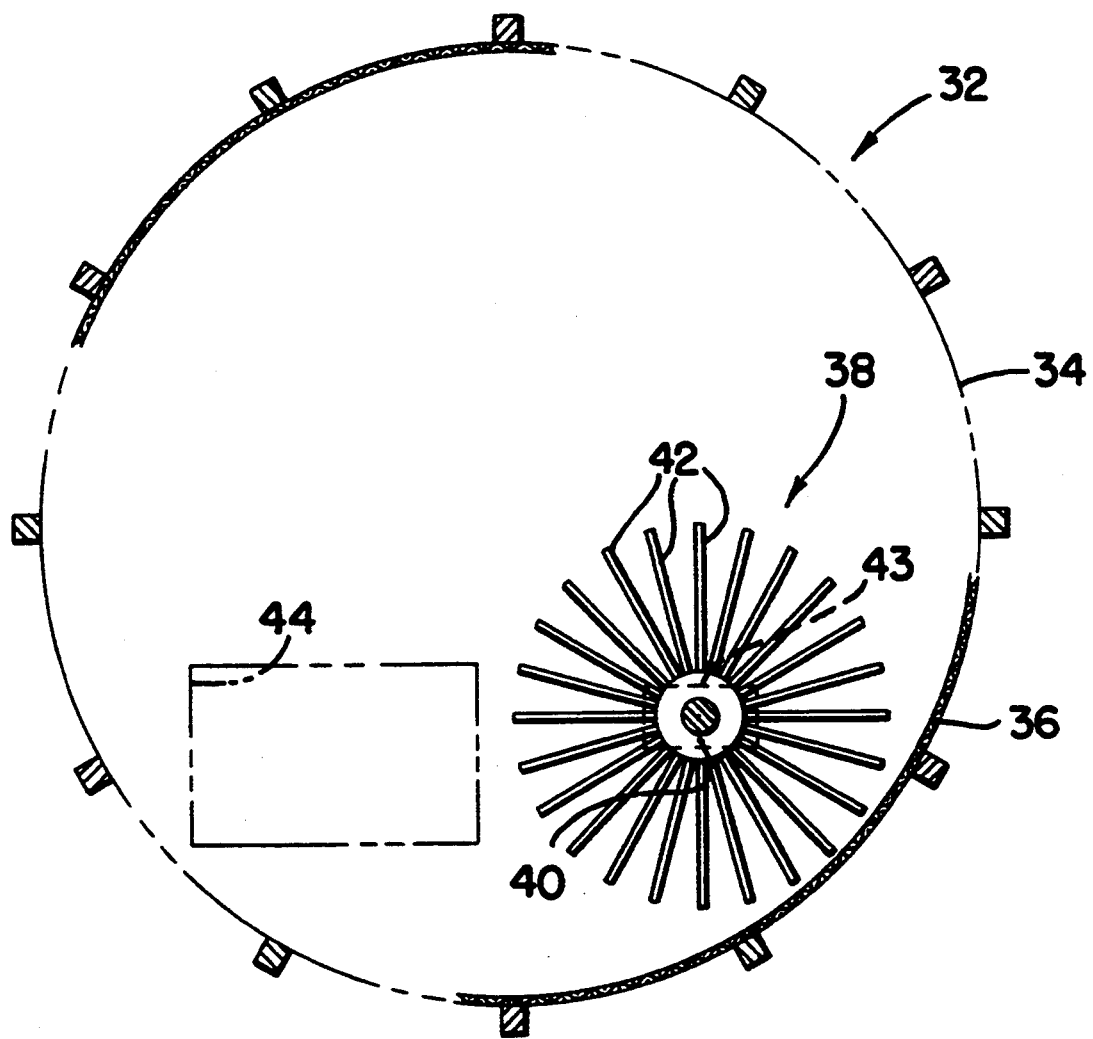

FIG_3
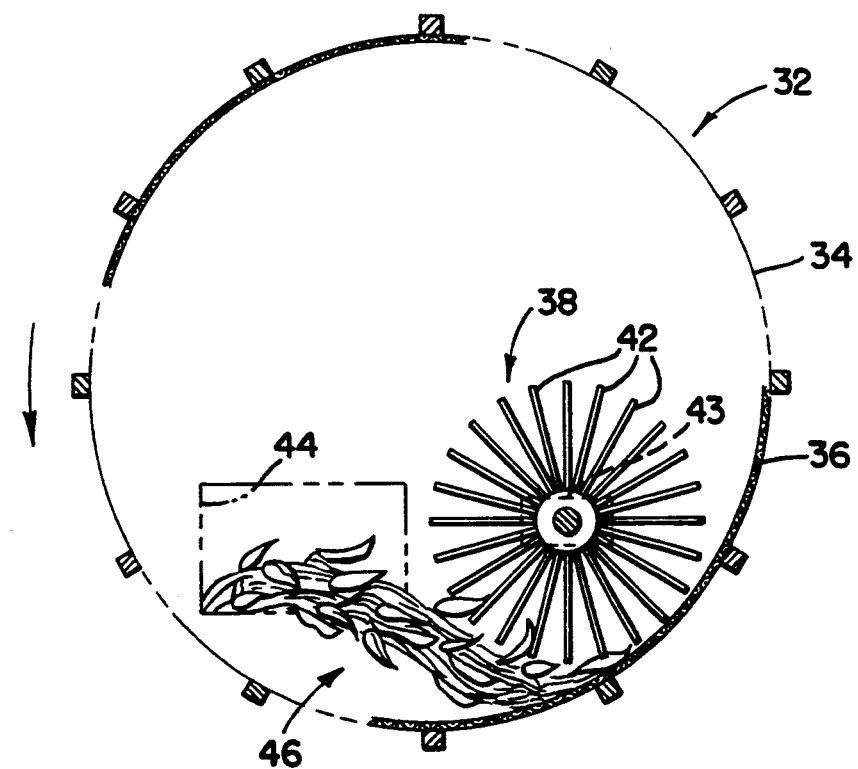
FIG_4
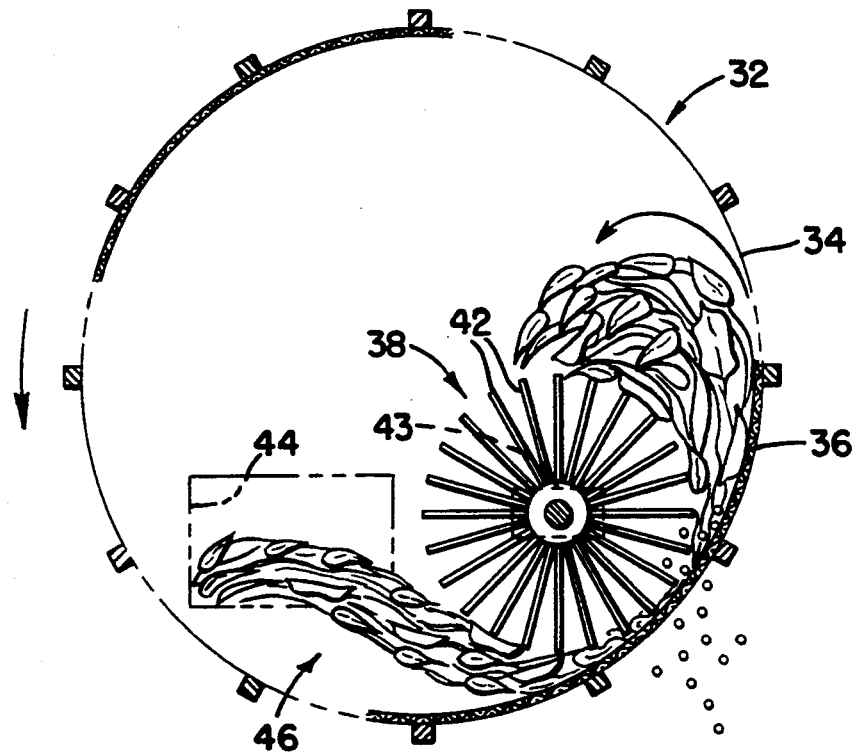

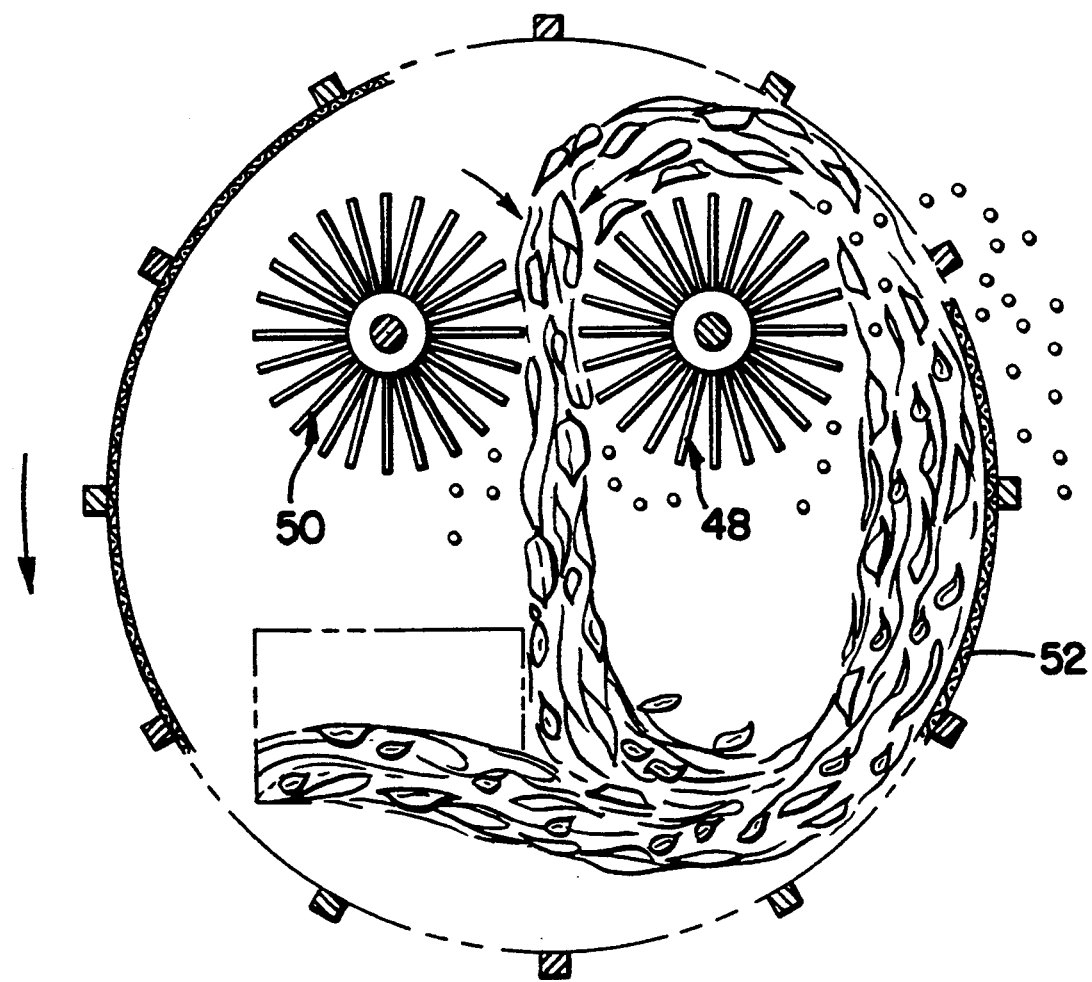

LEGUME POD THRESHER

This application is a continuation, of application Ser. No. 07/920,966, filed Jul. 28, 1992, abandoned.

BACKGROUND OF THE INVENTION

1. Field of the Invention

This invention has to do with the harvesting of legumes such as, peas, lima beans, broad beans as well as other types of beans sometimes hereinafter referred to as seeds. More specifically this invention is an apparatus that is normally transported through a field to "shell" legumes as they are being harvested. The core of the apparatus is a rotary brush-like threshing means having projecting tines or rods that are vibrated at a predetermined adjustable frequency. The rods intercept the flow of the vine mass and legumes in their pods through the harvesting/threshing machine and impart positive and negative acceleration in the mass such that the seeds impact against the restraining pod and break the pod such that the seeds are separated from the pods and can thereafter be separated by gravity, or a mechanical separator, for subsequent collection. The rods also contact some pods with impact forces that tend to split or break the pods.

2. Brief Description of the Known Art

Legume harvesters have traditionally relied on impact forces to separate the seeds from the pods or casings. Many legume harvesters include beaters, paddles or rotary mounted flat surfaces that impact or swat the legume containing mass of vines and pods. This impact forces the pods to fracture and thus release the contained seeds. These rotary beater machines are effective but will cause some damages to a certain portion of the crop due to bruising, splitting or pulverizing of the product. In this type of beater machine the pods may be subjected to six or more impacts per cycle with the beaters. This high incidence of impacts increases the chance that free peas, for instance, will be struck by a beater and damaged. Harvesting and threshing means of this general type, that is, of the type having beaters, are shown in U.S. Pat. Nos. 3,709,231 and 3,771,531.

A tomato harvester incorporates a shaker section having a forced balanced drive for use in shaking fingers like the apparatus disclosed herein. The tomato harvester is shown in U.S. Pat. No. 4,335,570 which is assigned to the same assignee as this application.

SUMMARY OF THE INVENTION

In the apparatus presented herein the object of the invention is to cause the separation of peas, beans, seeds and the like from the cases or pods in which they grow with the least amount of damage possible at a speed and efficiency that justifies the expenditure of capital for the harvester. This object is accomplished by directing a mass of vines containing e.g. pea pods to a threshing means that includes tines or vibrating fingers that are energized to vibrate in the path of the mass of vines being fed into the harvester. As the mass of vines and pods is contacted by the vibrating fingers, the acceleration imparted to the peas in the pods as well as the impact of the pea pods, against the vibrating fingers causes the seeds (peas or beans, etc.) to escape from the pods. Once the seeds are released from the pods the seed to fall through a screen that separates the vines and pods in a convention manner from the seeds—the seeds being the desired end product.

In a preferred embodiment the mass of vines is fed into a reel—a large generally circular drum having openings for the escape of peas or beans which is common to conventional pea harvesters—which contains a threshing means having the vibrating fingers. The threshing means assembly, herein sometimes referred to as the threshing means, is arranged longitudinally in the reel with its center line generally parallel to the rotational center line of the reel. The threshing means may be of a length shorter than the length of the reel however in a preferred embodiment it will be almost as long as the length of the reel. The reel will rotate such that the mass of vines is directed into a "bite" between the reel surface and the vibrating fingers of the threshing means. The vibrating fingers of the threshing means are all close to the same length and extend outwardly from a central axis of the threshing means. The threshing means and the reel both are driven in the same direction.

As the mass of vines enters the bite the seed (peas, beans, etc.) containing pods will contact the vibrating fingers and will be opened or partially opened enough to allow the seeds to be shaken out of their pods. The threshing means is provided with a drive means, an eccentric weight drive commonly called a force balanced shaker for instance, to vary the amplitude and frequency of torsional vibration. Also means to vary the rotational speed of the threshing means assembly relative to the reel rotational speed is also provided. Thus the pods can be subjected to various degrees of opening forces depending on the crop variety and maturity.

The manner in which the object of this invention is realized will be apparent from an understanding of the following specification.

BRIEF DESCRIPTION OF THE DRAWINGS

Fig. 1 is a side elevation view of a field harvester for seeds such as peas and beads providing the threshing principles of the present invention.

FIG. 2 is a representation of the threshing chamber of the field harvester shown in FIG. 1.

FIG. 3 is a representation of vines to be threshed entering the threshing chamber of FIG. 2.

FIG. 4 is a representation of the seeds exiting the threshing chamber of FIG. 2.

FIG. 5 is a representation of an alternative embodiment of the invention.

DETAILED DESCRIPTION OF THE INVENTION

The preferred embodiment of this invention is shown in the first four drawing figures. Fig. 1 is presented to simply show the environment of invention. In Fig. 1 the field going legume harvester generally 10 is supported on ground engaging wheels 12. Trailing rear wheels 16 can be moved up and down in a conventional manner to adjust the fore and aft inclination of the harvester so that its inclination with respect to the horizontal can be maintained at the angle selected to insure flow of product through the threshing unit. Thus, the rear wheels are mounted on trailing arms 18 pivoted to the frame and raised and lowered by vertical hydraulic cylinder assemblies 22. A cab and engine compartment 24 are provided and means are also provided for driving the front wheels 12 and the various hydraulic pumps for the hydraulic motors that operate the hydraulic conveyors, threshing means and other articles of equipment.

A pickup indicated generally at 26 is provided for removing the mass of vine and crops from the ground and introducing it into an elevator conveyor 28 that feeds the crop into the threshing unit of the present invention. The details of the pickup are not critical to the present invention except for the fact that the crop is fed into a lower portion of the thresher as best seen in FIG. 3.

FIG. 2 is a representation of the threshing chamber generally 32 which shows the two critical elements of the invention. The large diameter rotating reel or screen 34 has the usual openings in the screen portion such as 36 which is carried around the circumference of the reel in a conventional manner. The reel is mounted for rotation around its longitudinal axis in a conventional manner most usually by a hydraulic motor. Drive means is not critical to the invention. In FIG. 2 the rotation of the reel would be counterclockwise and would be as if looking from the back of the field harvester.

Carried inside the reel is the threshing means generally 38 which is mounted for rotational movement with its net rotational motion being counterclockwise. The threshing means, generally 38, is a long apparatus, generally as long as the interior working area of the reel, that has a diameter somewhat less than the interior diameter of the reel. In the preferred embodiment shown the "diameter" of threshing means 38 is about eighty two centimeters from the tip of one finger to the tip of the finger opposite the first finger.

The threshing means includes a central axle 40 into which a plurality of vibratory fingers, such as 42 are inserted and retained. The fingers are preferably made of fiberglass rods three-eights of an inch in diameter and numerous fingers are inserted along the length of the threshing means central axle such that as the vines and seed pods pass between the threshing means and the reel there is a greater than not chance that a seed pod will be in the vicinity of vibrating finger as the vine mass moves between the threshing means and the interior wall of the reel.

The threshing means 38 includes a drive means, indicated representatively at 43, for varying the amplitude and frequency of rotational oscillation, or torsional vibration, of axle 40 such that the consequent amplitude and frequency of oscillation of vibrating fingers 42 is variable, but would be around twenty cycles per second in a preferred embodiment. As stated above one means of driving the threshing means with the necessary vibratory induced motion is shown in U.S. Pat. No. 4,335,570 mentioned above. Item 44 is a representation of the general location of infeed or supply of to-be-threshed seed pods as well as vines which makes up the vine mass.

In FIG. 3 the vine mass generally 46 is shown entering the threshing chamber through representative infeed area 44 and being deposited on the reel. The vine mass 46 follows the surface of the rotating reel 34 into the bite between the rotating threshing means 38 and the reel surface—again this surface is a screen or perforated surface well known in the art. The threshing means 38 also has a net counterclockwise rotation sympathetic with—but not necessarily the same speed as the surface speed of reel 34.

As shown in FIG. 4 when the vine mass encounters the vibrating fingers the pods are opened or partially opened enough to allow seeds to be shaken out of the pods. (In most instances the seeds are peas or beans.) Release of the seeds is accomplished by the vibrating fingers 42 rapidly accelerating and/or decelerating the seeds in the pods or the pods relative to the seeds as well as partially threshing and partially shaking the seeds from the pods. As stated above, the threshing means 38 is provided with means, such as the force induced drive, to vary the amplitude and frequency of torsional vibration of threshing means 38. Threshing means 38 is also provided with means to vary the rotational speed of the whole rotor assembly (generally by varying the speed of the hydraulic drive motor). Thus the seed pods can be subjected to various degrees of opening forces depending on crop variety and maturity.

FIG. 4 is a simple representation showing that some seeds have been released from their pods and the seeds passed through the screen surface of the reel. The seeds will be collected in a well known manner. The vine mass continues up and over the threshing means and will eventually tumble to the relative bottom of the threshing chamber where the vine mass will again enter the bite between the threshing means and the screen but at a point downstream of its initial entry point depending on the inclination of threshing chamber 32 (which can be elevated or lowered in a well known manner by means of the cylinders 28).

Another embodiment of the invention is shown in FIG. 5 wherein multiple thresher means 48 and 50 are provided. These thresher means are smaller versions of the thresher means 38 shown in FIGS. 2 through 4 and operate in substantially the same way as the single thresher means embodiment with the difference being the flow of the vine mass through the unit. For instance in this FIG. 5 unit the vine mass will enter the thresher at the relative floor portion and as the reel 52, which is similar to the reel shown in FIGS. 2, 3 and 4 rotates counterclockwise the vine mass will be carried upwardly and enter the bite between the counterclockwise rotating thresher means 48 and then be generally directed into the bite between the two thresher means 48 and 50. These rotate counter to each other, that is the thresher means 48 rotates counterclockwise and the thresher means 50 rotates clockwise, An alternative embodiment would have the reel rotating clockwise and the vine mass then feeding first into the bite between the reel surface and the vibrating threshing means 50. In these FIG. 5 embodiments the actual threshing is done in the same manner as in the preferred embodiment.

Three separate embodiments have been disclosed herein and other embodiments are contemplated by the inventors. For instance, the vibratory threshing means could be located in other zones of the area described by the reel interior circumference could be changed to effect optimum threshing. These alternatives are contemplated as being within the scope of the following claims.

What is claimed is:

1. In a legume harvester apparatus for effecting the release of legumes from pods containing legumes, said apparatus comprising:

a reel having an interior portion, said reel carried for rotation on said harvester, said reel comprising an elongated enclosure having a perforated surface with a plurality of openings of small size relative to the surface area of the reel and forming a bite between a threshing means and said interior surface of said reel;

said threshing means mounted for rotary motion and driven by a force balanced shaker to provide vibration in said legume harvester, said threshing means having an axle means parallel to an axle means of said reel;

a plurality of rods comprising vibrating tines emanating outwardly from said axle means of said threshing means;

said threshing means moving in a rotary direction the same as said reel;

means for supplying a mass of vines into the interior portion of said reel whereby said mass of vines will be carried by said reel to said bite and said mass of vines will be vibrated by contact with said vibrating tines of said threshing means.

2. The invention in accordance with claim 1 wherein said threshing means is located in a lower quadrant of the interior of said reel offset from the vertical center line of the reel.

3. The invention in accordance with claim 2 wherein said threshing means occupies more than twenty percent of the interior area of said reel.

4. The invention in accordance with claim 3 wherein the vibrating tines on said axle of said threshing means are fiberglass rods emanating from said axle.

5. The invention in accordance with claim 4 wherein said fiberglass rods are vibrated by said force balanced shaker at a variable frequency of oscillation.

6. The invention in accordance with claim 5 wherein said frequency of oscillation is close to twenty cycles per second.

7. In a harvester for effecting the release of seeds from pods containing seeds, said harvester comprising:

a reel having an interior portion, said reel carried for rotation on said harvester, said reel comprising an elongated enclosure having a perforated surface with a plurality of openings of small size relative to the surface area of the reel;

a plurality of threshing means mounted for rotation inside said reel, said threshing means driven by a force balanced shaker with at least one of said threshing means being driven in the same direction as said reel and forming a bite between said threshing means and the interior surface of said reel, said threshing means including axle means parallel to an axle means of said reel;

means for supplying a mass of vines into the interior portion of said reel whereby said mass of vines will be carried by said reel to said bite and said mass of vines will be vibrated by contact with the plurality of said threshing means.

8. The invention in accordance with claim 7 wherein one of said plurality of threshing means is driven in a direction opposite another of said threshing means.

9. The invention in accordance with claim 8 wherein said threshing means are located in said reel with their central axis above a horizontal center line of said reel.

10. The invention in accordance with claim 8 wherein the area of said threshing means is greater than twenty percent of the interior area of said reel.

11. An apparatus for harvesting pods containing legumes which comprises:

a reel comprising an elongated, cylindrical enclosure having a plurality of openings therein, the enclosure defining an interior of the reel;

the reel being mounted for rotation on the harvester;

a first threshing means for effecting the release of the legumes from the pods;

the first threshing means comprising a central axle and a plurality of tines extending radially outwardly from the axle;

the axle being mounted parallel to the axis of the reel for rotary motion within the reel;

means for rotating the first threshing means; and means for varying the amplitude and frequency of torsional vibration of the first threshing means.

12. The apparatus of claim 11, wherein the threshing means is mounted within the reel so as to form a bite between the threshing means and the interior surface of the reel.

13. The apparatus of claim 12, wherein the threshing means is located in a lower quadrant of the interior of the reel.

14. The apparatus of claim 13, wherein the threshing means occupies more than twenty percent of the interior of the reel.

15. The apparatus of claim 11, further comprising a second threshing means for effecting the release of the legumes from the pods.

16. The apparatus of claim 15, wherein the first threshing means is mounted in a first upper quadrant of the interior of the reel and the second threshing means is mounted in a second upper quadrant of the interior of the reel.

17. The apparatus of claim 16, wherein the first and second threshing means rotate in opposite directions.

18. The apparatus of claim 11, wherein the tines comprise fiberglass rods.

19. The apparatus of claim 11, wherein the means for varying the amplitude and frequency of torsional vibration of the threshing means is adjustable to vary the frequency of vibration of the tines.

20. The apparatus of claim 19, wherein the frequency of vibration is in the range of twenty cycles per second.

21. The apparatus of claim 11, wherein the means for varying the amplitude and frequency of torsional vibration of the threshing means is a force balanced drive.

22. The apparatus of claim 11, wherein the means for rotating the threshing means is adjustable to selectively vary the rate of rotation.

23. An apparatus for harvesting pods containing legumes which comprises:

a reel comprising an elongated, cylindrical enclosure having a plurality of openings therein and being mounted for rotation on the harvester;

a thresher comprising a central axle and a plurality of tines extending radially outwardly from the axle, the thresher being mounted for rotary motion within the reel with the axle being parallel to the longitudinal axis of the reel;

means for varying the amplitude and frequency of torsional vibration of the thresher.

* * * * *